United States Patent [19]
Bedard et al.

[11] Patent Number: 5,738,485
[45] Date of Patent: Apr. 14, 1998

[54] PALLET HANDLING APPARATUS

[75] Inventors: Jean-Denis Bedard; Michael Fennel, both of Brossard, Canada

[73] Assignee: Coprodev Inc., Quebec, Canada

[21] Appl. No.: 767,219

[22] Filed: Dec. 16, 1996

[51] Int. Cl.$^6$ ........................ B65G 59/06
[52] U.S. Cl. .............. 414/795.4; 221/301; 414/795.2; 414/797.5; 414/933
[58] Field of Search ............. 414/795.2, 796.9, 414/797.5, 798.1, 933, 795.4, 798; 221/299, 301

[56] References Cited

U.S. PATENT DOCUMENTS 3,325,021 6/1967 Burns et al. ............ 414/933 X
3,765,546 10/1973 Westerling ............. 414/933 X

FOREIGN PATENT DOCUMENTS 57-23534 2/1982 Japan ................. 414/797.5
8900654 10/1990 Netherlands .......... 414/795.2

*Primary Examiner*—Janice L. Krizek
*Attorney, Agent, or Firm*—Eric Fincham

[57] ABSTRACT

There is provided a pallet dispensing apparatus wherein the carriage assembly is reciprocably movable in a vertical direction and has first and second transversely extending rails with pallet supporting members secured thereto. Each of the rails has a cam member at an end thereof which is movable in an associated cam guide which has first and second generally vertically extending cam tracks, an upper cam guide track extending between upper portions of the inner and outer vertical channels and a lower cam guide track extending between lower portions of the inner and outer vertical channels. The guiding movement of the cam guide with associated cam members causes the transversely extending rails to rotate and permit the dispensing of a single pallet.

10 Claims, 15 Drawing Sheets

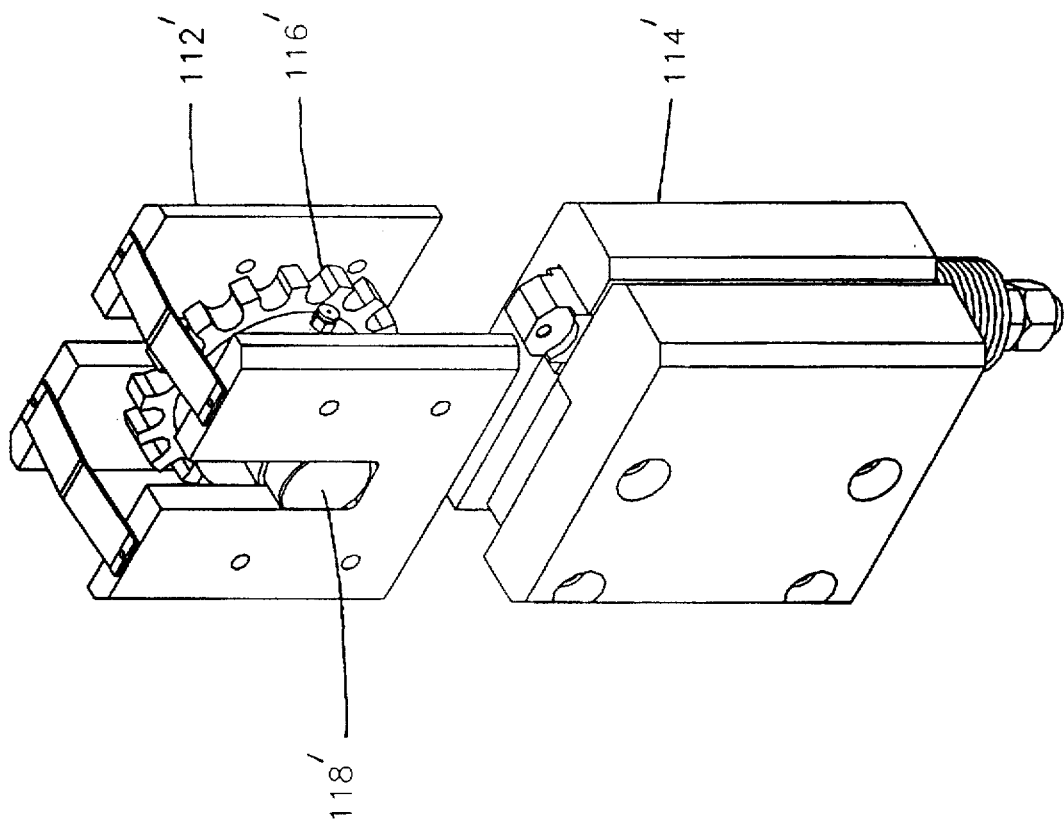

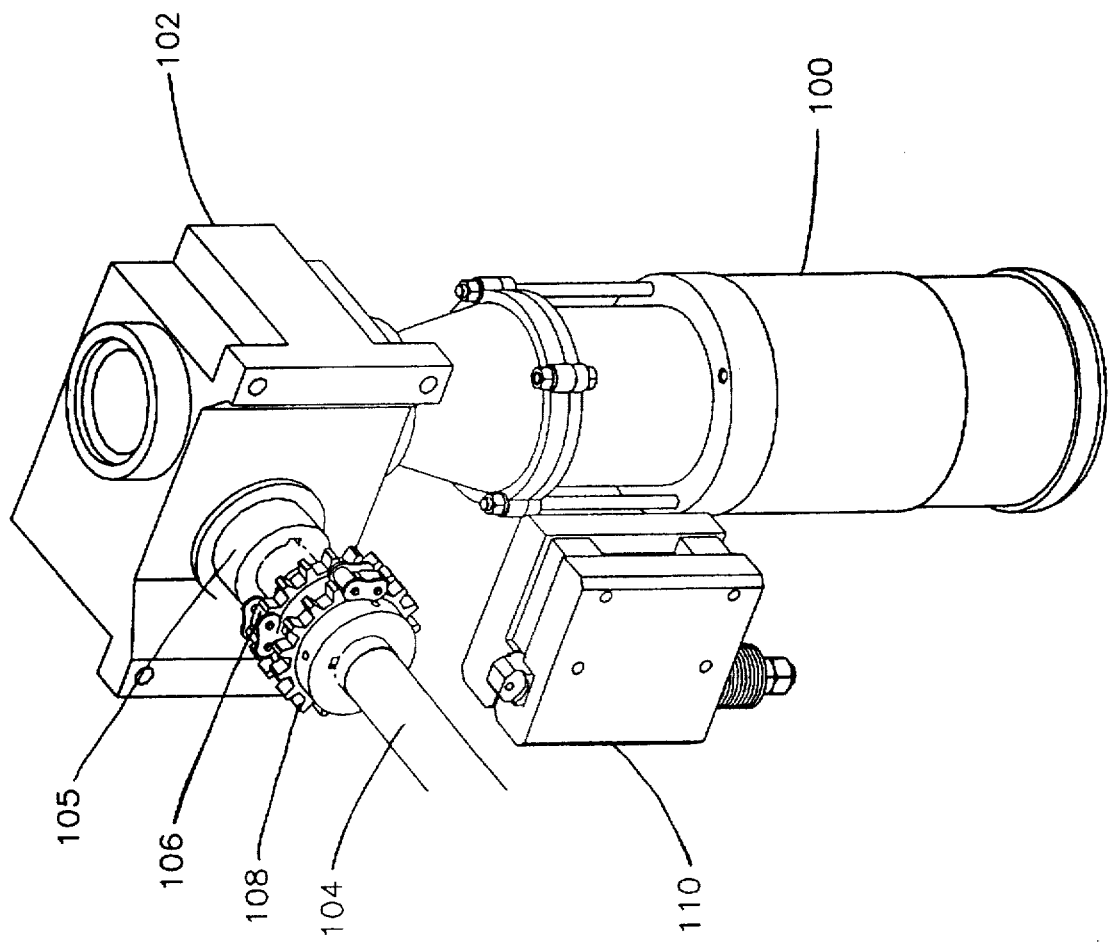

PALLET HANDLING APPARATUS

BACKGROUND OF THE INVENTION

The present invention relates to pallet handling devices and more particularly, relates to improvements in a pallet dispenser and stacker.

The handling of empty pallets has long been an operation which utilized manual labour wherein empty pallets are stored in stacks and then used singly as required. Such an operation is frequently required in conjunction with a conveyor system where the pallets are placed on the conveyor. Conversely, a pallet stacking requires the removal of empty pallets from a conveyor and stacking them.

As mentioned above, the pallet is usually removed from the stack by either a fork lift truck or manually.

More recently, there have been proposals for pallet dispensing devices which use various means for controlling the stack of pallets and dispensing them singly. Although such devices are commercially available, they tend to be relatively expensive systems which have a limited flexibility in their ability to accept pallets in different directions. Many of the dispensing systems are unable to be used with conveyors and/or are not suitable for different uses. Most can not be used for stacking pallets from a conveyor.

SUMMARY OF THE INVENTION

It is an object of the present invention to provide a pallet handling apparatus which can be modified to function as a pallet dispenser or a pallet stacker.

It is a still further object of the present invention to provide a pallet handling apparatus having a novel cam guiding arrangement.

It is a further object of the present invention to provide a pallet dispensing system wherein an electrical-mechanical drive is used.

It is a further object of the present invention to provide a pallet dispensing system wherein the pallets can be dispensed singly from a stack of pallets onto a conveyor system.

According to one aspect of the present invention, there is provided a pallet dispensing apparatus which comprises a frame, a carriage assembly, and drive means connected to the carriage assembly for reciprocally driving the carriage assembly in a vertical direction. The carriage assembly comprises first and second transversely extending rails, each of the rails having at least one supporting member secured thereto for supporting a pallet load. A cam is located at least at one end of each of the rails and there is provided a cam guide designed to receive each of the cams. Each of the cam guides has inner and outer generally vertically oriented cam tracks, with an upper cam track extending between the upper portions of the inner and outer cam tracks. A lower cam track extends between lower portions of the inner and outer cam tracks, with the cam tracks being adapted to guide the cams and associated carriage assembly during movement thereof.

According to a further aspect of the present invention, there is provided a pallet handling apparatus which comprises a frame, a carriage assembly and electric drive means connected to the carriage assembly for reciprocably driving the carriage assembly in a vertical direction, the carriage assembly having first and second transversely extending rails, at least one pallet supporting member secured to each of the transversely extending rails, a cam roller located at one end of each of the rails, a cam guide associated with each of the cam rollers, each of the cam guides having means for guiding the cam roller along a cam track, the cam track comprising an inner generally vertically oriented cam track, an outer generally vertically oriented cam track, an upper cam track extending between the inner and outer cam tracks proximate an upper portion thereof, and a lower cam track extending between lower extremities of the inner and outer cam tracks, the cam tracks being adapted to guide the cam rollers along the cam tracks during movement thereof.

In greater detail, the pallet dispensing apparatus of the present invention provides a compact device which may be situated above a conveyor track or other associated device for purposes of dispensing or collecting the pallets as required. The apparatus includes a suitable frame which may be welded or mechanically secured together. A carriage assembly having a pair of transversely extending rails which in turn have at least one and preferably a plurality of pallet supporting members mounted thereon is used as a shuttle.

The carriage assembly, as aforementioned, is reciprocably driven in a vertical direction. Although many different types of drive means may be employed, it is preferred that an electric drive be utilized since the pallet dispensing apparatus may be used in many different types of environments wherein hydraulic or like mechanisms can present a contamination problem.

The transversely extending rails and the associated pallet supporting members are guided in their movement by cam rollers preferably located at each end of the rails and which cam rollers are mounted in a cam guide. The cam guide has a cam track which guides the cam rollers along a predetermined path as will be discussed in greater detail hereinbelow.

The pallets are guided into position with respect to the pallet supporting members by suitable guide means. Preferably, the guide means are adjustable and can be quickly set up to receive pallets of different sizes and/or pallets which are oriented in different directions.

The apparatus of the present invention will include suitable controls and safety devices as may be required. Thus, one can utilize sensors to determine whether a pallet is in the proper position; lacking such a pallet, the system will not operate. Similarly, the use of limit switches and the like to cause the reciprocal movement is known in the art and need not be discussed in detail herein.

A unique feature of the present invention is the use of a different cam guide which would enable the apparatus to function as a pallet stacker.

Having thus generally described the invention, reference will be made to the accompanying drawings illustrating an embodiment thereof, in which:

BRIEF DESCRIPTION OF THE DRAWINGS

FIG. 7 is a detailed perspective view of a wear guide and idler sprocket at an opposed end of the apparatus;

FIG. 8 is a detailed perspective view of the electric drive and transfer mechanism;

DESCRIPTION OF THE PREFERRED EMBODIMENTS

Figure 1:
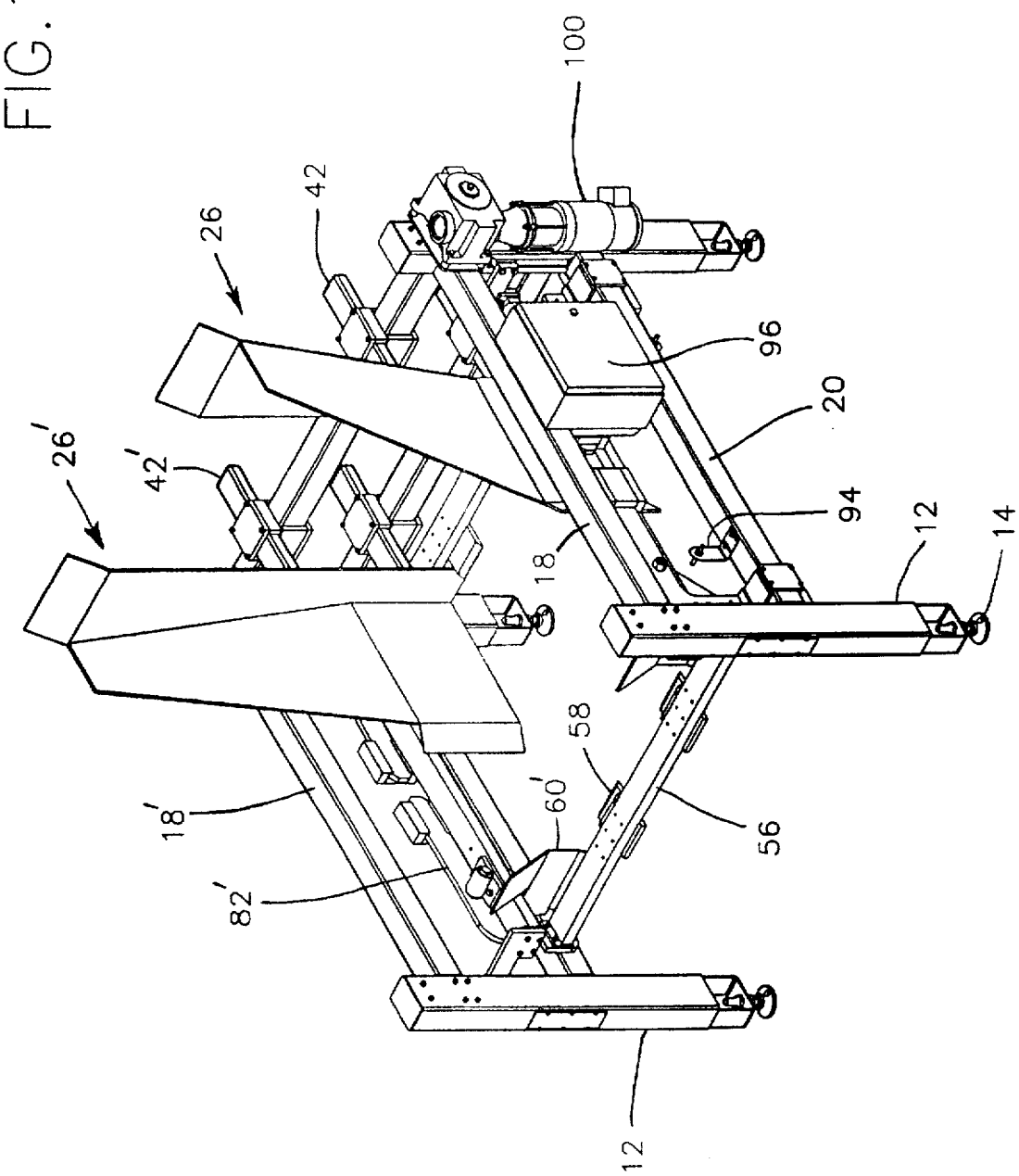
FIG. 1 is a perspective view of a pallet dispensing apparatus according to an embodiment of the present invention.
Figure 2:
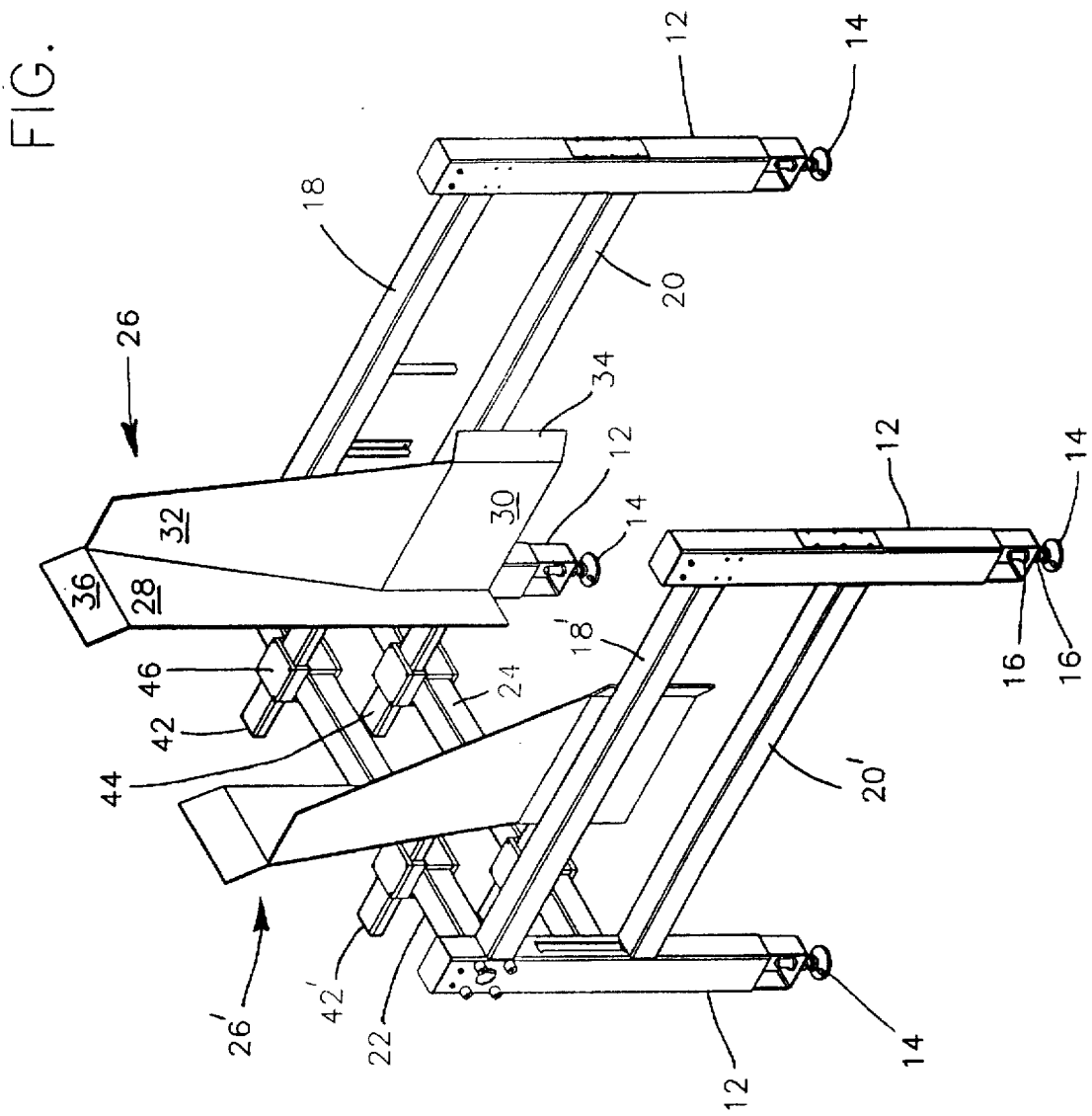
FIG. 2 is a perspective view of the apparatus of FIG. 1 illustrating the frame and guide components without the drive and carriage mechanisms.
Figure 3:
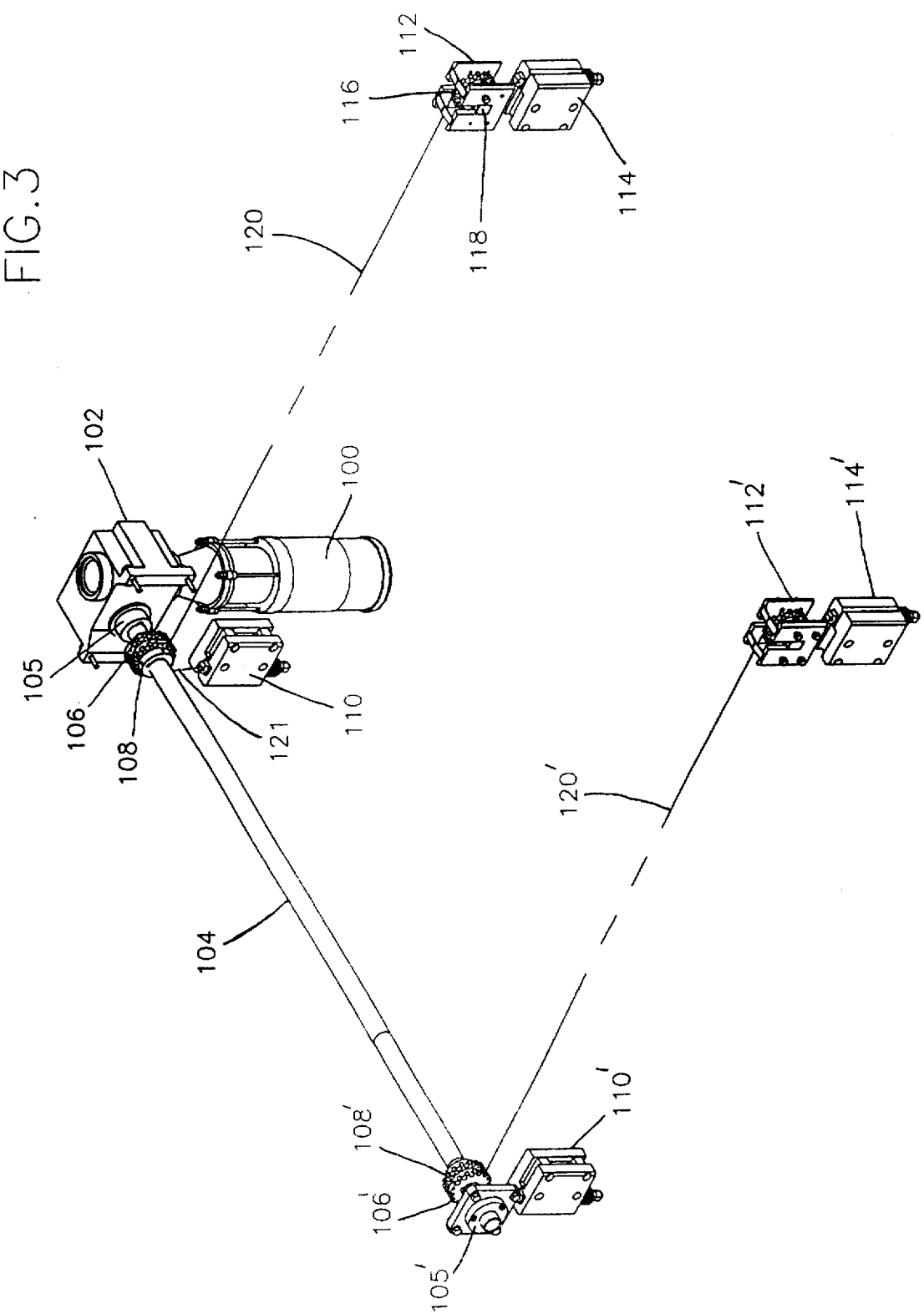
FIG. 3 is a view of the drive components of the present invention.

Referring to the drawings in greater detail, and by reference characters thereto, there is illustrated in FIG. 1 a pallet dispensing apparatus which as may be best seen in FIG. 2, includes four vertical posts 12 each having a foot pad 14 adjustably retained thereon by means of nuts 16. A pair of upper horizontal side frame members 18, 18' extend between pairs of vertical posts 12. Also extending between vertical posts 12 are lower horizontal side frame members 20 and 20'. At the rear of the apparatus, there is provided a rear upper horizontal frame member 22 and a rear lower horizontal frame member 24.

Located adjacent each side of the apparatus are guide members 26 and 26' which are mirror images of each other and thus only one will be described herein. Guide member 26 includes a rear plate portion 28 which extends substantially vertically adjacent rear horizontal frame members 22 and 24. A side portion of guide member 26 is formed of a lower side plate 30 and an upper side plate 32. It will be noted that upper side plate 32 angles outwardly as it extends upwardly in order to properly guide pallet members. At the upper peripheral edge of rear plate 28, there is provided an upper guide flange 36 while at a side marginal edge of lower side plate 30 there is provided a lower guide flange 34.

Guide member 26 is supported by means of an upper horizontal support bar 42 and a lower horizontal support bar 44. Both upper horizontal support bar 42 and lower horizontal support 44 are secured to rear upper horizontal frame member 22 and rear lower horizontal frame member 24 respectively by means of brackets 46 and which permit horizontal movement of support bars 42 and 44 for adjustment purposes. Brackets 46 also permit movement along support bars 42 and 44 to thereby permit adjustment of the spacing between guide members 26 and 26'. Guide member 26' is secured in a similar manner.

Figure 4:
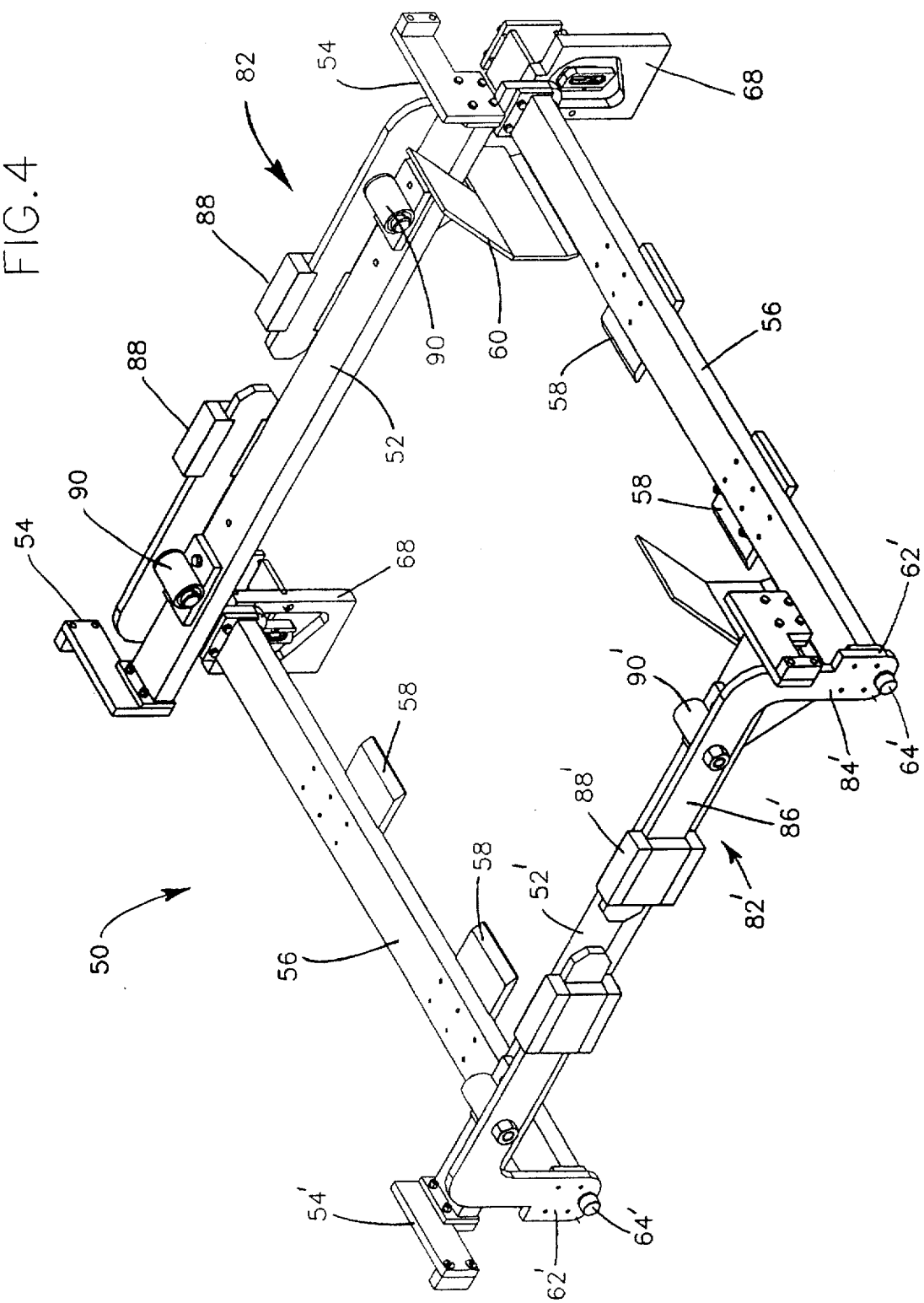
FIG. 4 is a perspective view of the carriage assembly thereof.
Figure 5:
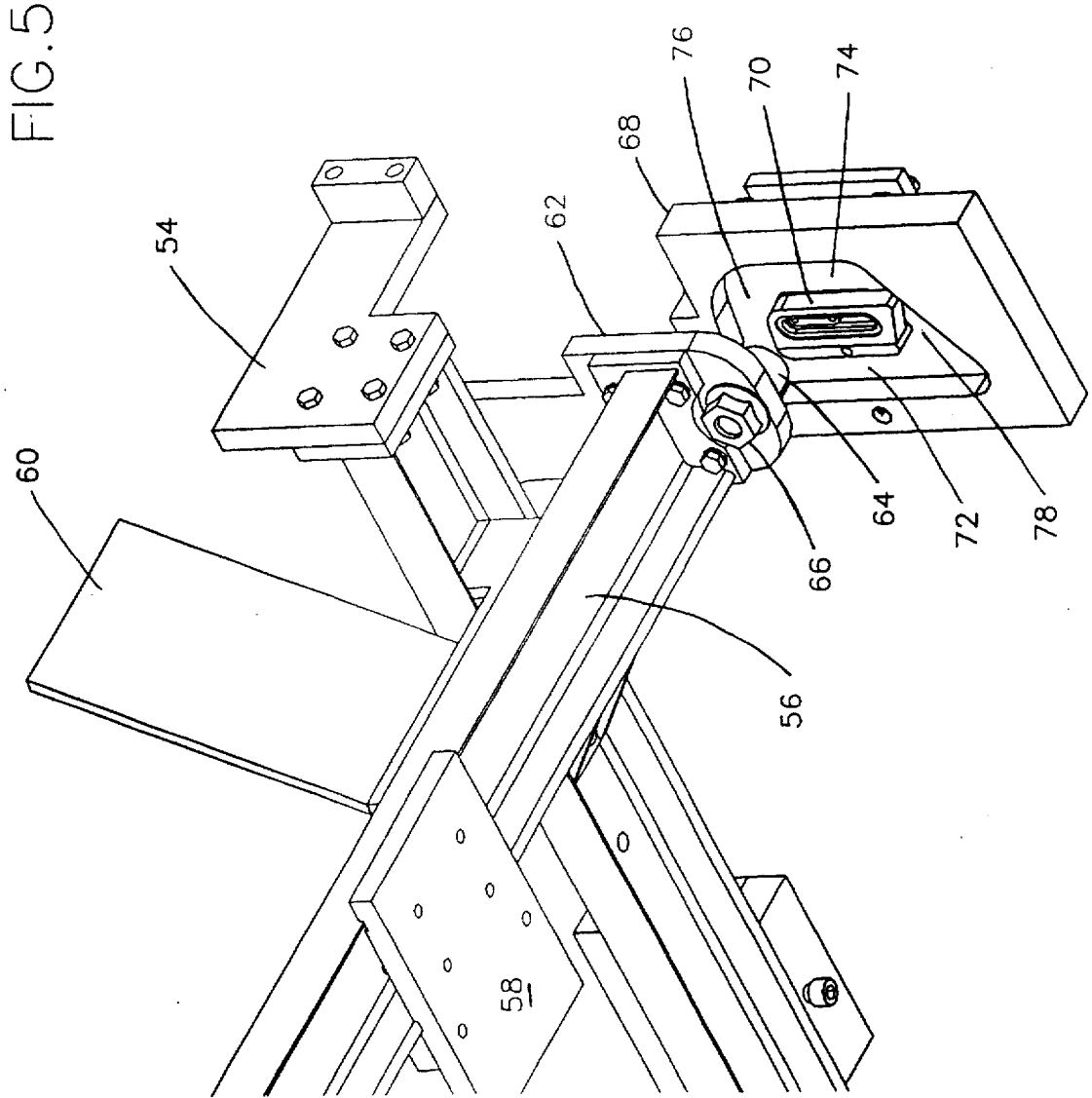
FIG. 5 is a detailed perspective view illustrating a portion of the cam guide arrangement.
Figure 6:
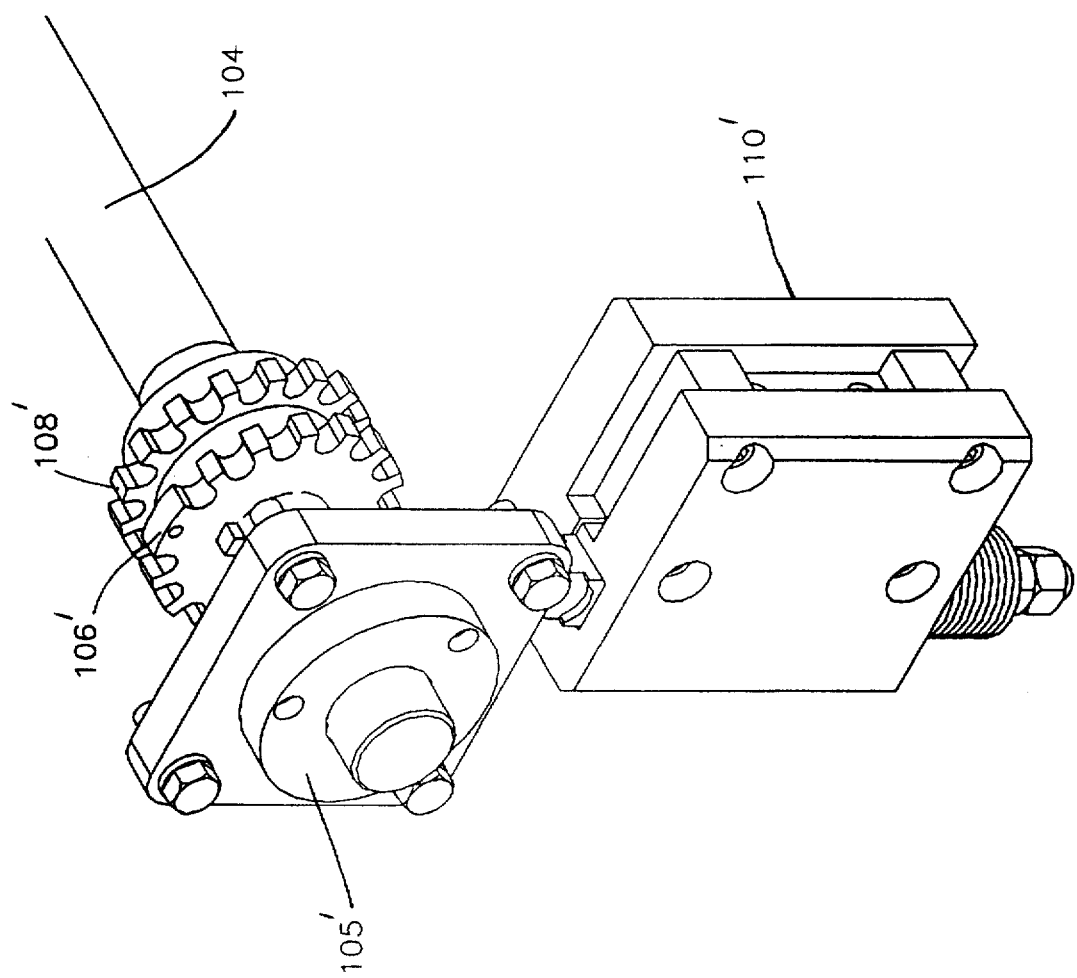
FIG. 6 is a detailed perspective view of a wear guide and associated drive sprockets.

The carriage assembly is illustrated in FIGS. 4 and 5 and will now be referred to. Carriage assembly is generally designated by reference numeral 50 and includes a pair of side carriage frame members 52 and 52'. Again, the carriage assembly is substantially symmetrical about a vertical plane and only one portion will be described herein it being understood that the other side is substantially identical and where appropriate, similar reference numerals with a prime are utilized.

Carriage frame member 52 has at either end an L-shaped bracket 54, 54' for securement to wear slides 110 and 114 (described hereinbelow). Extending between carriage frame members 52 and 52' are a pair of rails 56. Again, both components are substantially identical and hence only one will be described herein.

Rail 56 includes a pair of pallet engaging members 58 suitably secured to the underside thereof. As will be noted, pallet engaging members 58 extend inwardly a distance sufficient to engage pallets as will be described in greater detail hereinbelow. Also secured to rail 56 are a pair of pallet guides 60 which are used to guide pallets misaligned at this end of the apparatus.

At each end of rail 56, there are provided cam plates 62 and 62' which again are substantially identical. Cam plates 62 and 62' are located at one end of arms 82 and 82' respectively. Cam plate 62 includes a cam roller 64 extending outwardly therefrom; nut 66 functions to maintain cam roller 64 secured to cam plate 62.

Figure 9B:
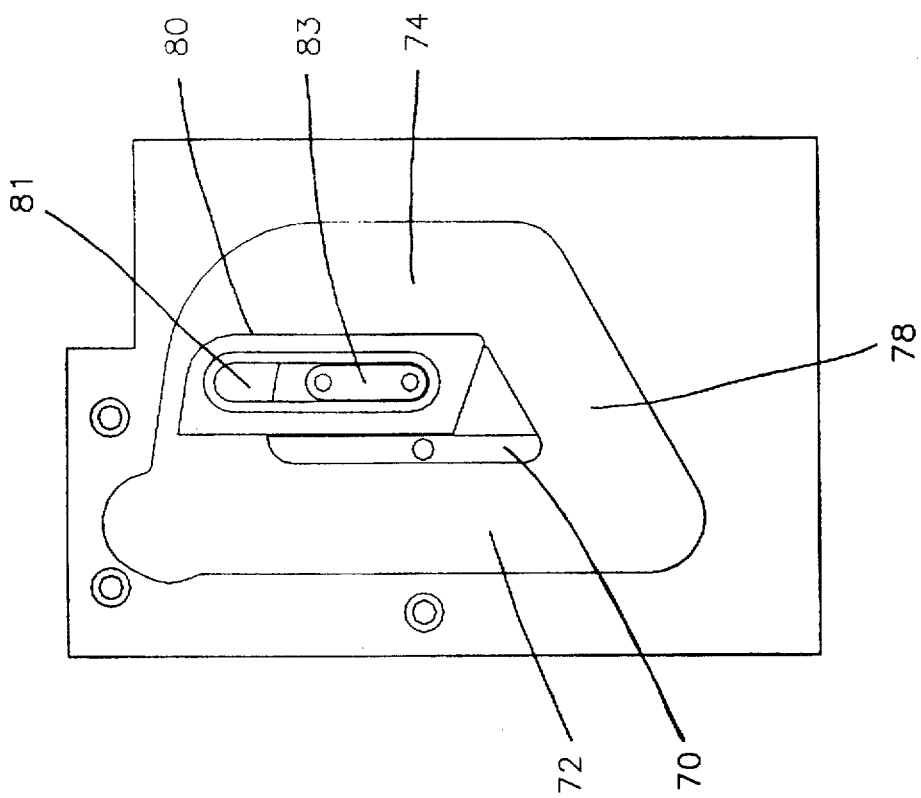
FIG. 9B is a view similar to 9A illustrating the stop member in a second position.
Figure 9A:
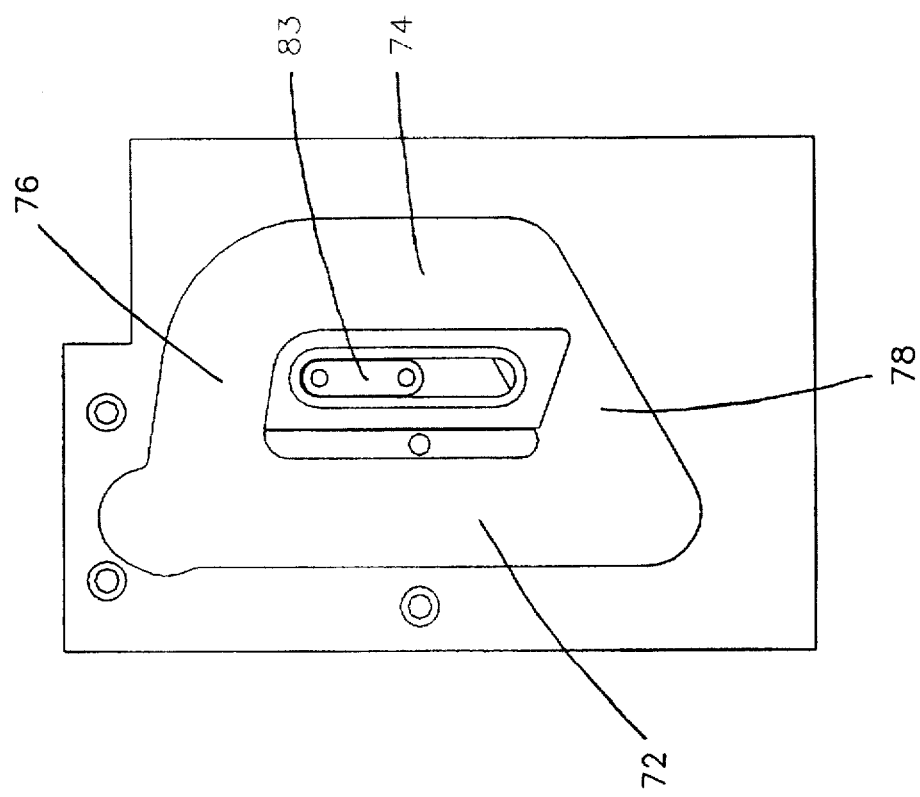
FIG. 9A is a side elevational view of one of the cam guides with associated stop member.

A cam guide member 68 is best illustrated in FIGS. 5, 9A and 9B and will now be referred to. Cam guide member 68 has one face thereof which includes a recess; an insert 70 is placed in the recess to thereby define a plurality of cam guide tracks. There is thus an inner vertical cam guide track 72 defined by one wall of the recess and insert 70 and an outer vertical cam guide track 74 defined by an opposed wall of the recess and insert 70. Inner vertical cam guide track 72 and outer vertical cam guide track 74 are substantially parallel although as may be seen they have a different length. Interconnecting the upper portions of inner vertical cam guide track 72 and outer vertical cam guide track 74 is an upper cam guide track 76. At their lower extremity, inner vertical cam guide track 72 and outer vertical cam guide track 74 are connected by a lower cam guide track 78 which, as may be seen from FIG. 5, is not horizontal but rather extends somewhat diagonally.

A check bar or stopper 80 is mounted on insert 70; an elongated aperture is provided centrally of stopper 80 to permit slidable movement thereof. A retaining member 83 maintains check bar 80 on insert 70.

Arms 82 and 82' are provided exteriorly of carriage frame members 52 and 52' respectively. As may be best seen in FIG. 4, arm 82' includes a vertical portion 84' and which vertical portion 84' terminates at its lower end in cam plate 62'. A horizontal portion 86' of arm 82' has a counterweight 88' secured thereto. Arm 82' is rotatably journalled in a bushing of bracket 90' which is mounted on an upper surface of carriage frame member 52'.

The pallet dispensing apparatus includes a drive system which, in the illustrated embodiment, uses an electric motor 100 which is operatively connected to a gear box 102. Through gear box 102, a shaft 104 extends transversely through rear upper horizontal frame member 22. Mounted on shaft 104, at the end adjacent the gear box 102, is a first gear 106 and a second 108. A similar arrangement is provided at the opposed end with sprockets 106' and 108'. A wear guide 110 is mounted within its associated post 12 and is connected to sprocket 108 by means of a chain 121. At the other end, rotational movement of shaft 104 will be translated through a chain 120 to wear guide 114 by means of an idler sprocket 116 mounted on shaft 118 within bracket 112. As shown in FIG. 1, the apparatus has an electrical control box 96 and a sensor 94 to determine the presence of a pallet.

In operation, and as shown in FIGS. 11 to 15, the movement of the pallets is illustrated. Thus, in the arrangement of FIG. 11, there is provided a first pallet P1 which is sitting on a conveyor C situated below the apparatus. In this position, the cam is located in the cam guide at the junction of inner cam guide track 72 and upper cam guide track 76.

Pallet engaging elements 58 are in a horizontal position and support pallet P2 thereon.

Figure 12:
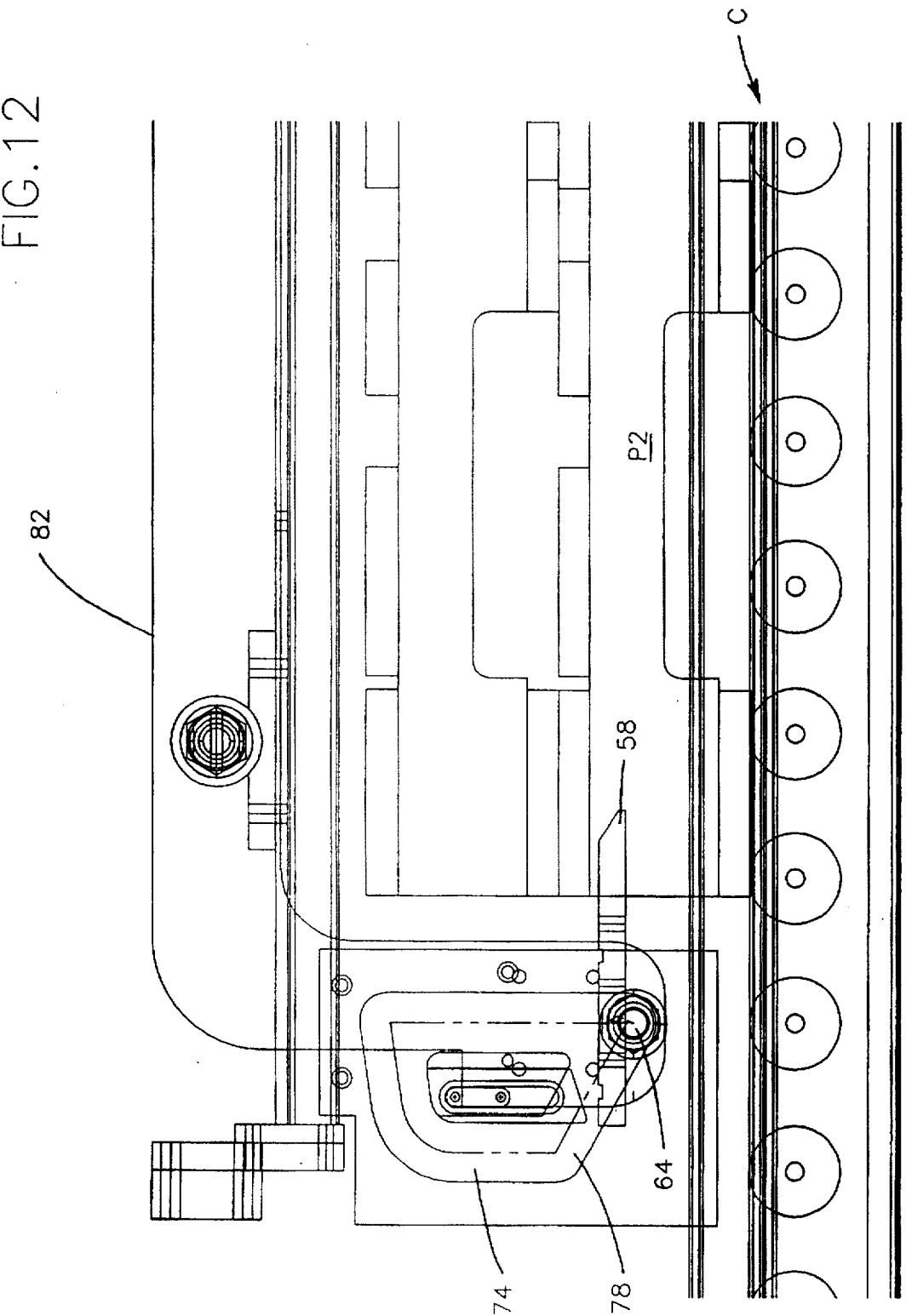

In FIG. 12, pallet P1 has been removed by conveyor C and cam 64 has moved downwardly within inner vertical cam guide track 72 to a position of juncture with lower cam guide track 78. During this downward movement, pallet engaging elements 58 have retained pallets P2 and those situated thereon in the desired position. As a result, pallet P2 and the other pallets are deposited on conveyor C.

Figure 13:
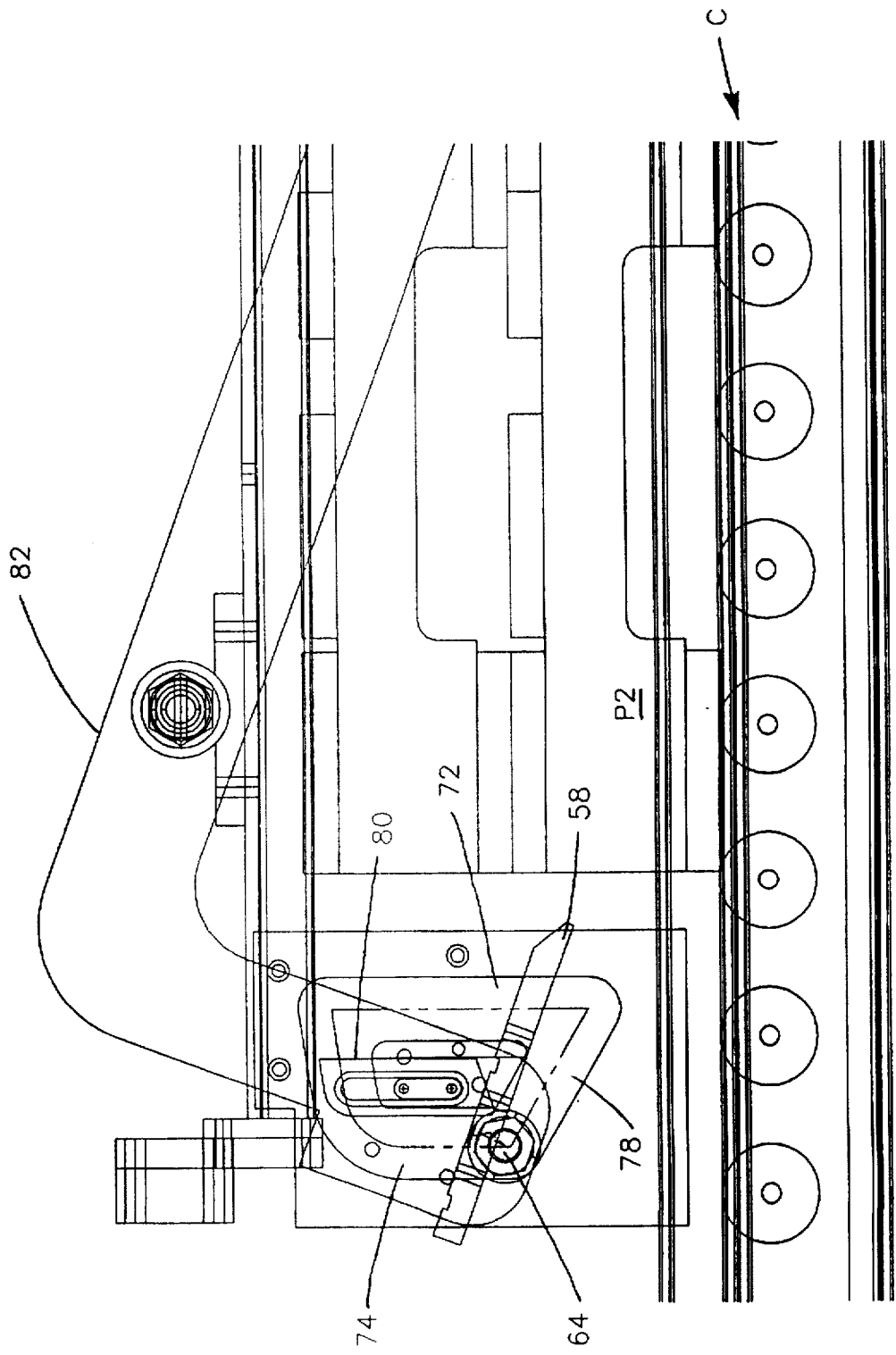

As shown in FIG. 13, when cam 64 moves within lower cam guide track 78 in a direction from inner vertical cam guide track 72 towards outer vertical cam guide track 74, a tilting motion occurs with pallet engaging elements 58 moving outwardly and rotating in conjunction with arm 82. It will be seen that cam roller 64 moves past check bar 80 which initially moves upwardly and then downwardly to prevent cam roller 64 from returning to cam guide track 72. In this respect, counterweight 88 will function to ensure that cam roller 64 enters cam guide track 78 by biasing cam roller 64.

Figure 14:
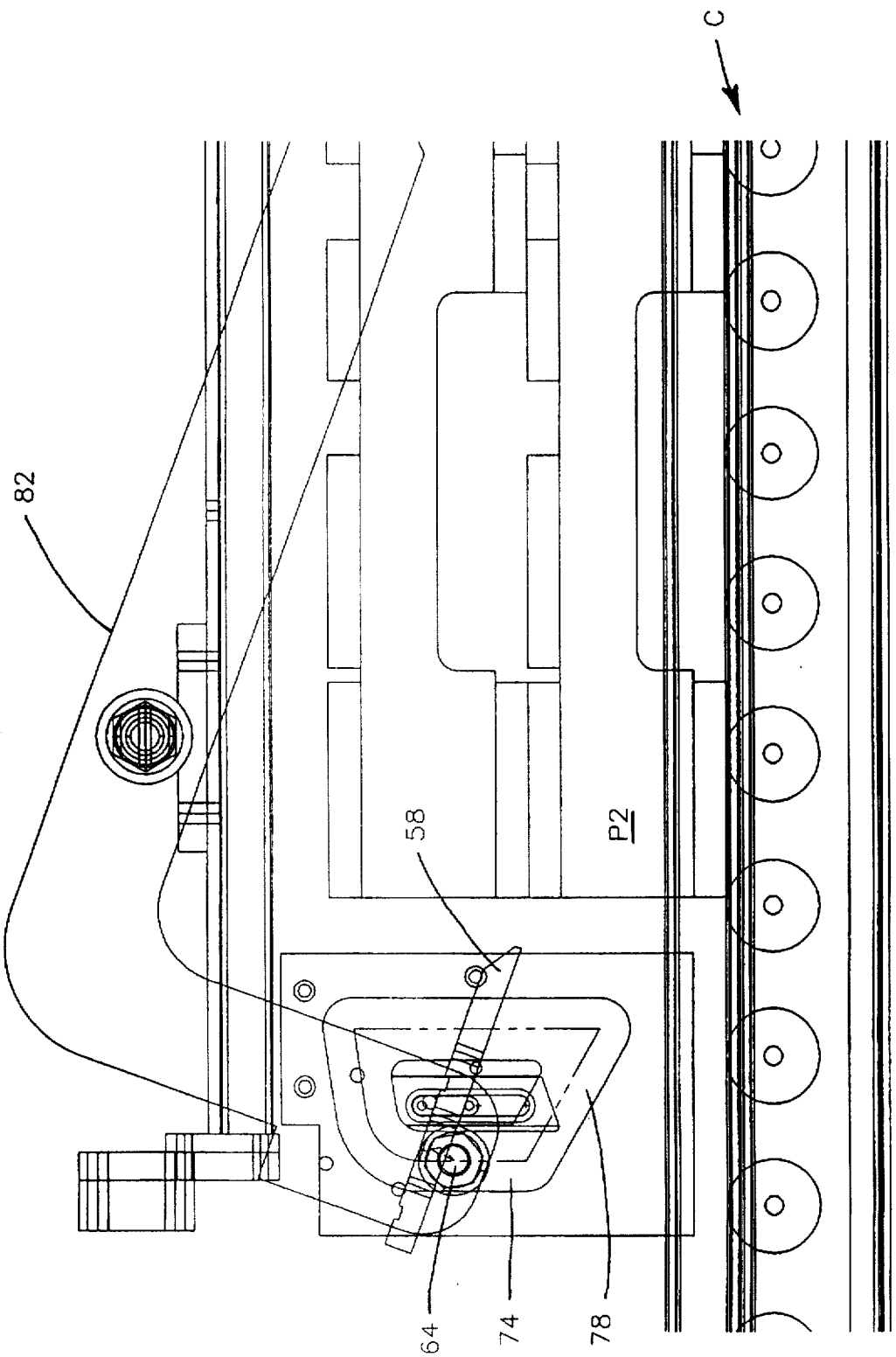
Figure 15:
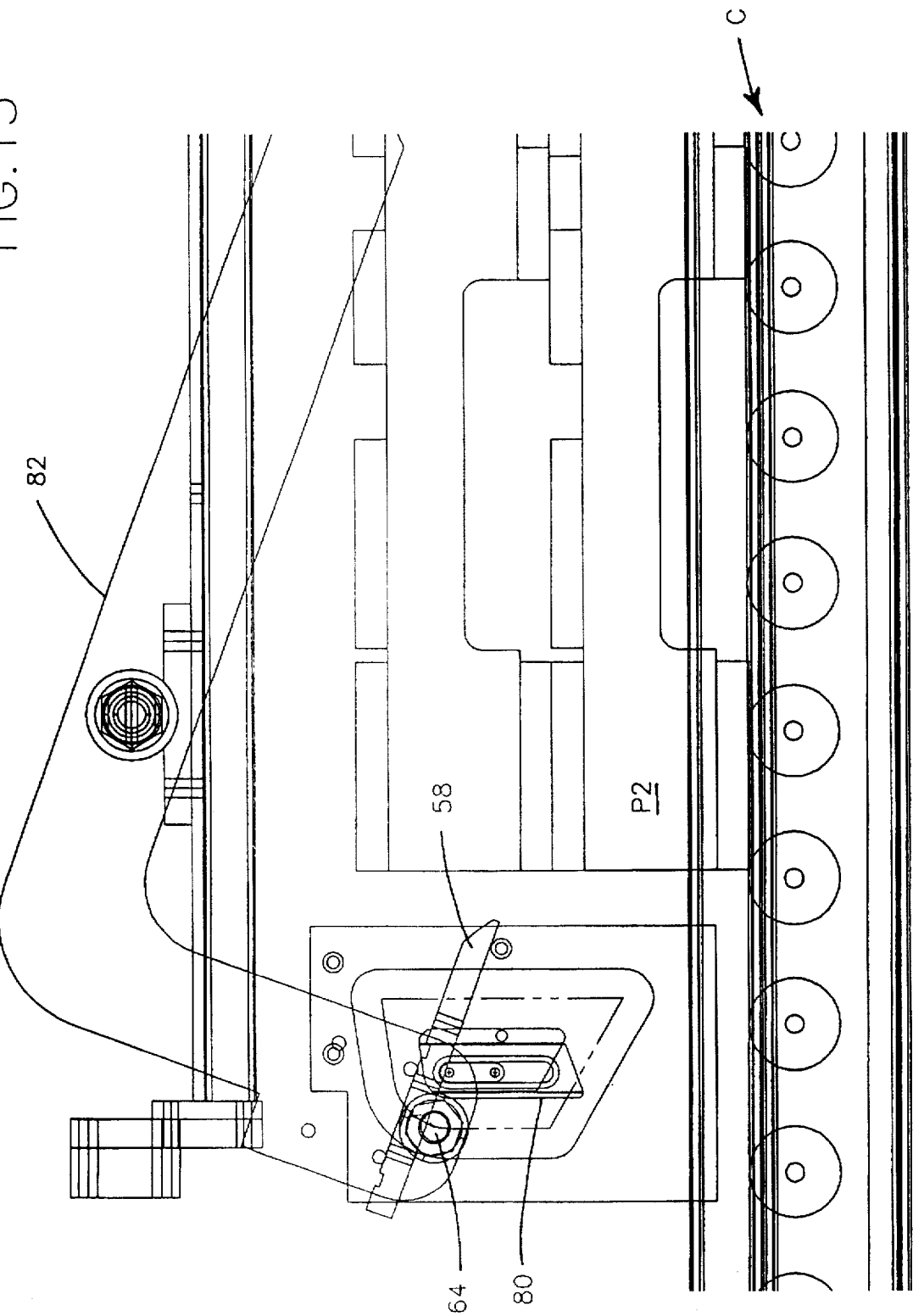

In the position illustrated in FIG. 14, cam 64 moves upwardly in outer vertical cam guide track 74 in a position wherein pallet engaging elements 58 are removed from engagement with the pallets. Subsequently, as shown in FIG. 15, cam 64 will start to move along upper cam guide track 76 in a direction toward inner vertical cam guide track 72. It will then reach the position of FIG. 11 wherein it will engage the pallet stack and raise them to thereby permit removal of pallet P2.

Figure 10B:
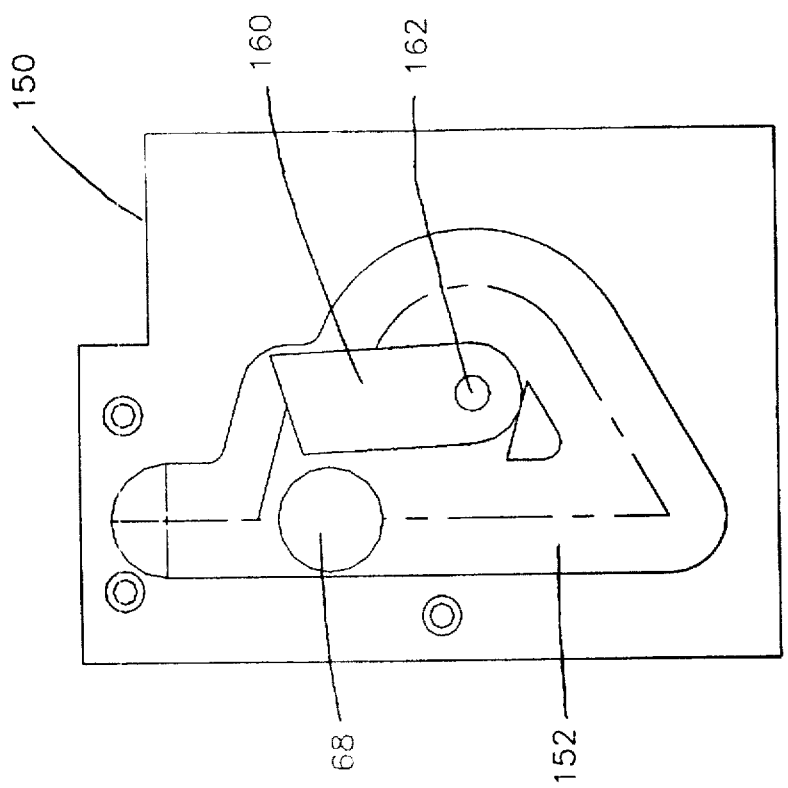
FIG. 10B is a view similar to FIG. 10A illustrating the stop member in a second position.
Figure 10A:
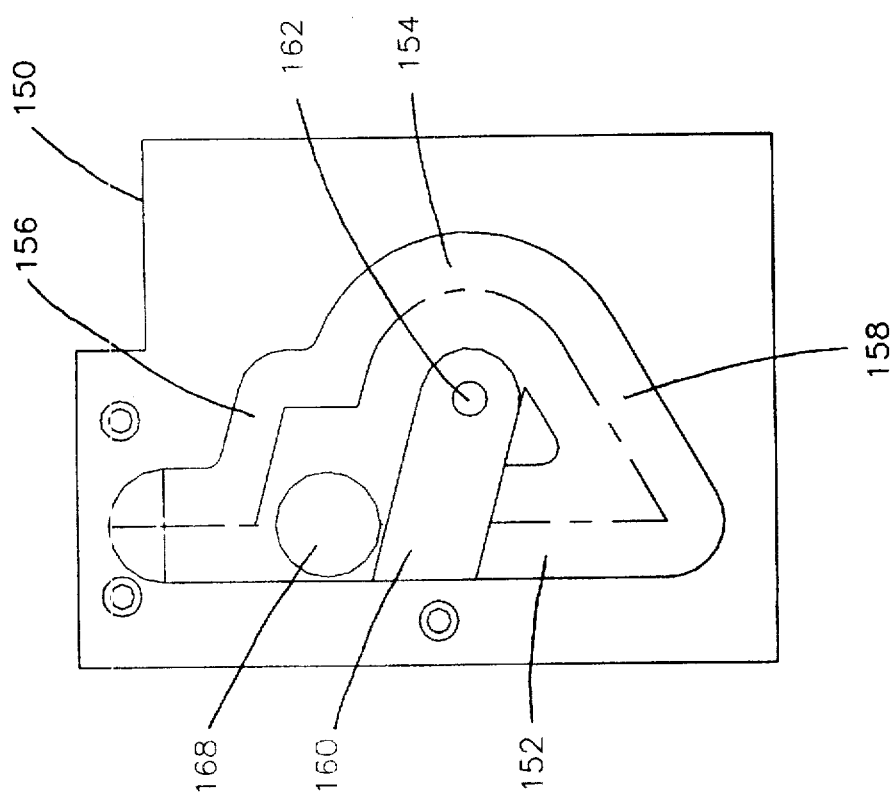
FIG. 10A is a side elevational view of a cam guide suitable for use with a pallet stacker, the cam guide being illustrated with a stopper in a first position.
Figure 11:
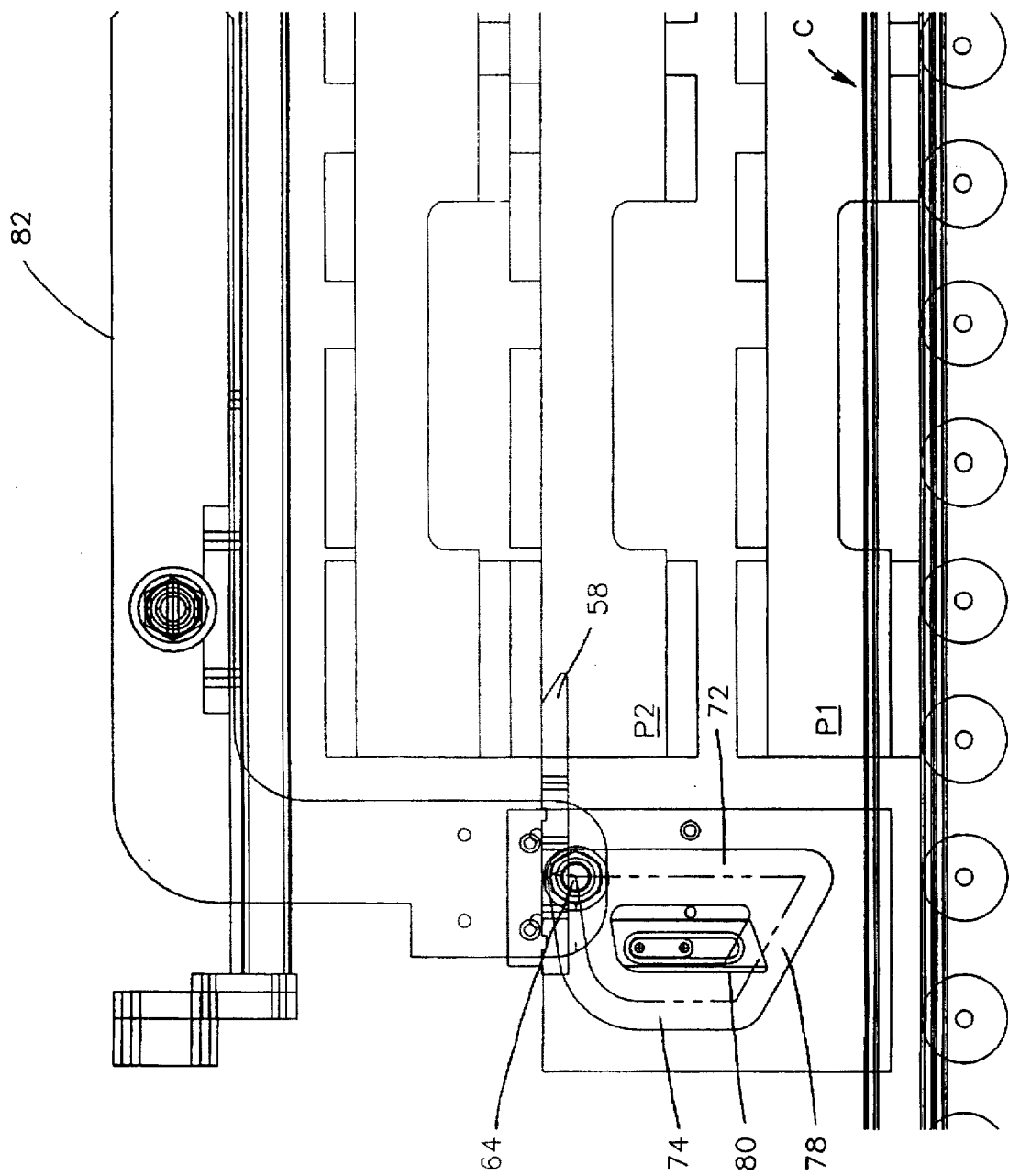
FIGS. 11, 12, 13, 14, and 15 are similar views illustrating movement of the carriage assembly as it follows a predetermined path.

A cam guide which may be used in association with the apparatus of the present invention such that the apparatus may be used as a pallet stacker is shown in FIGS. 10A and 10B. In this arrangement, cam guide 150 has an inner recess in a manner similar to that described with respect to cam guide 68. The inner recess defines a plurality of cam tracks which are also partially defined by the outer wall of the recess. Thus, there is provided an inner generally vertically extending cam track 152 and an outer cam track 154. An upper cam track 156 communicates between cam tracks 152 and 154 while there is also provided a lower cam track 158 extending between lower portions of cam tracks 152 and 154. A check bar 160 is pivotably mounted at point 162 to permit movement of a cam roller 168 in only one direction. Thus, as may be seen in FIG. 10B, upward movement of cam roller 168 will cause stopper 160 to pivot about pivot point 162 and permit passage of cam roller 168. After passing the upward extremity, stopper 160 will be returned to the position shown in FIG. 10A (either by gravity or suitable biasing means) wherein roller 168 is forced into the cam track 156 and 154.

It will be understood that the above described embodiments are for purposes of illustration only and that changes and modifications may be made thereto without departing from the spirit and scope of the invention.

We claim:

1. A pallet dispensing apparatus comprising a frame, a carriage assembly and drive means connected to said carriage assembly for reciprocally driving said carriage assembly in a vertical direction, said frame including four vertical posts, a wear guide assembly mounted within each of said posts, each of said wear guide assemblies being operatively connected to said drive means and said carriage, said carriage assembly having first and second transversely extending rails, at least one supporting member secured to each of said transversely extending rails, a cam member located at each end of said rails, a cam guide designed to receive each of said cam members, each of said cam guides having inner and outer generally vertically oriented cam guide tracks, an upper cam guide track extending between upper portions of said inner and outer cam guide tracks, and a lower cam guide track extending between lower portions of said inner and outer cam guide tracks, said cam guide tracks being adapted to guide said cam member and said carriage assembly during movement thereof.

2. The apparatus of claim 1 wherein said drive means comprises an electric motor, first and second rotatable shafts extending between first and second pairs of said vertical posts, each of said rotatable shafts being connected at respective ends by a chain drive.

3. The apparatus of claim 1 further including a limit switch operatively connected to said drive means for reversing said drive means and the direction of movement of said carriage.

4. The apparatus of claim 1 further including guide means mounted on said frame for guiding a stack of pallets to said carriage assembly.

5. The apparatus of claim 4 wherein said guide means are adjustable in a horizontal plane.

6. A pallet handling apparatus comprising a frame, a carriage assembly and electric drive means connected to said carriage assembly for reciprocably driving said carriage assembly in a vertical direction, said carriage assembly having first and second transversely extending rails, at least one pallet supporting member secured to each of said transversely extending rails, a cam roller located at one end of each of said rails, a cam guide associated with each of said cam rollers, each of said cam guides having means for guiding said cam roller along a cam track, said cam track comprising an inner generally vertically oriented cam track, an outer generally vertically oriented cam track, an upper cam track extending between said inner and outer cam tracks proximate an upper portion thereof, and a lower cam track extending between lower extremities of said inner and outer cam tracks, said cam tracks being adapted to guide said cam rollers along said cam tracks during movement of said cam rollers, said apparatus further including four arms mounted on said frame, each of said arms being pivotably connected thereto, each of said arms carrying said cam roller at one end thereof, a counterweight being mounted at the other end of each of said arms to thereby bias said cam roller in a desired direction within said cam track.

7. The apparatus of claim 6 wherein said frame includes four posts, frame members extending between said posts, and a wear guide assembly mounted within each of said posts.

8. The apparatus of claim 7 wherein said cam guide comprises a member having a recess formed therein, a wall surrounding said recess, said wall defining said cam tracks.

9. The apparatus of claim 8 further including an insert member located within said recess, said cam track being defined by said insert and said wall surrounding said recess.

10. The apparatus of claim 9 further including a moveable check member, said check member being mounted so as to be moveable into and out of one of said cam tracks, said check member being arranged such that said cam roller can pass said check member in only one direction.

* * * * *